United States Patent [19]

Kapp et al.

[11] Patent Number: 5,757,603
[45] Date of Patent: May 26, 1998

[54] ELECTRICAL SURGE PROTECTION DEVICE

[75] Inventors: Wilhelm Kapp, Goleta; Ronnie Lee Bell, Santa Barbara, both of Calif.

[73] Assignee: Joslyn Electronic Systems Corporation, Goleta, Calif.

[21] Appl. No.: 667,419

[22] Filed: Jun. 21, 1996

[51] Int. Cl.$^6$ .................................... H02H 1/04
[52] U.S. Cl. .................. 361/118; 361/56; 361/656; 361/111
[58] Field of Search ................. 361/56, 117, 118, 361/119, 124, 126, 127, 131, 111, 633, 636, 640, 656

[56] References Cited

U.S. PATENT DOCUMENTS

| | | | |
|---|---|---|---|
| 2,010,814 | 8/1935 | Ellis | 201/76 |
| 2,600,407 | 6/1952 | Kelsay | 200/115 |
| 2,724,793 | 11/1955 | Fisher | 317/66 |
| 4,233,641 | 11/1980 | Baumbach | 361/119 |
| 4,642,733 | 2/1987 | Schacht | 361/118 |
| 4,649,457 | 3/1987 | Talbot et al. | 361/127 |
| 4,878,145 | 10/1989 | Lace | 361/118 |
| 5,010,438 | 4/1991 | Brady | 361/56 |
| 5,023,745 | 6/1991 | Glass | 361/56 |
| 5,317,473 | 5/1994 | Lundquist et al. | 361/117 |
| 5,410,443 | 4/1995 | Pelegris | 361/119 |
| 5,555,153 | 9/1996 | Frederickson et al. | 361/119 |
| 5,627,720 | 5/1997 | Lewis | 361/118 |

OTHER PUBLICATIONS

Description of Prior Art Product, 5 pages, No Date.
Drawing, FIG. 1, 1 sheet No Date.
Drawing, FIGS. 2, 3, 4A, 4B, 4C, 5, 1 sheet No Date.
Drawing, FIG. 6, 1 sheet No Date.

Primary Examiner—Jeffrey A. Gaffin
Assistant Examiner—Michael J. Sherry
Attorney, Agent, or Firm—Marshall, O'Toole, Gerstein, Murray & Borun

[57] ABSTRACT

An electrical surge protection apparatus is provided with first and second electrical terminals for connection to a first power line and third and fourth electrical terminals for connection to a second power line, a first conductive bus conductively connected to the first and second electrical terminals and a second conductive bus conductively connected to the third and fourth electrical terminals. Each of the conductive buses is sized to have a continuous current-carrying capability of at least about 60 amperes. The apparatus is also provided with a surge protector module having two terminals and a conductor which connects one terminal of the surge protector module directly to the first conductive bus and the other terminal of the surge protector module directly to the second conductive buss. The terminals of the surge protector module may be provided in the form of plug-in connectors, such as prongs, and the plug-in connectors may be plugged directly into a number of apertures or holes formed in the conductive busses.

21 Claims, 3 Drawing Sheets

ELECTRICAL SURGE PROTECTION DEVICE

BACKGROUND OF THE INVENTION

The invention is directed to an electrical surge protection device of the type used to protect equipment and electrical circuits from being damaged by overvoltage surge and/or excessive surge currents.

Surge protection devices are used to protect power lines and electrical equipment connected to the power lines from overvoltage surges, such as those caused by lightning for example. During an overvoltage surge, a surge protection device provides temporary surge protection by shunting the overvoltage surge to ground or neutral. Previously, surge protector modules have been connected to protect power lines and electrical equipment connected to the power lines against overvoltage surges. These surge protector modules have been shunt-connected to a power line by wires external to the surge protector module. For example, in a conventional three-phase power line having three individual power lines and a neutral conductor, one terminal of a surge protector module has been connected via an external wire to a point on one of the power lines, and the other terminal of the surge protector module has been connected via an external wire to a point on the neutral conductor.

The inventors recognized that the typical wire connections between surge protector modules and the power lines being protected are not optimal since such wires have a relatively large resistance and inductance. As a consequence, the surge voltage V across the two conductive lines (e.g. the voltage across the neutral conductor and one of the three individual power lines) is substantially higher than the suppression voltage $V_s$ of the surge protector module (i.e. the voltage across the terminals of the surge protector module while surge current flows through it). The surge voltage V and the suppression voltage $V_s$ are related in accordance with the following equation:

$$V = V_s + RI + L(dI/dt),$$

where R and L are the resistance and inductance, respectively, of the wires which connect the surge protector module to the power line, where I is the current which flows through those wires, and where dI/dt is the rate of change of the current I versus time.

A surge protector may be tested to determine the suppression voltage across its terminals. In one test administered in accordance with Underwriters Laboratories ("UL") Standard 1449, the surge protector being tested is subjected to a surge pulse having an open-circuit voltage of 6,000 volts (with a rise time of 1.5 microseconds and a 50% decay time of 50 microseconds) and a short-circuit current pulse of 3,000 amperes (with a rise time of eight microseconds and a 50% decay time of 20 microseconds). The UL standard specifies a number of different suppression voltages (i.e. the maximum voltage across the surge protector terminals in response to the surge pulse), the lowest of which is 330 volts.

SUMMARY OF THE INVENTION

The present invention is directed to an electrical surge protection apparatus having first and second electrical terminals adapted to be connected to first and second portions of a first power line, respectively; third and fourth electrical terminals adapted to be connected to first and second portions of a second power line, respectively; a first conductive bus having a first portion conductively connected to the first electrical terminal and a second portion conductively connected to the second electrical terminal and being sized to have a continuous current-carrying capability of at least about 60 amperes; and a second conductive bus having a first portion conductively connected to the third electrical terminal and a second portion conductively connected to the fourth electrical terminal and being sized to have a continuous current-carrying capability of at least about 60 amperes. The electrical surge protection apparatus is also provided with a surge protector module having at least one surge protector incorporated therein, the surge protector module having a first terminal and a second terminal, and means for conductively connecting the first terminal of the surge protector module directly to the first conductive bus and the second terminal of the surge protector module directly to the second conductive bus.

The conductive buses may be composed of solid bars of conductive material having a length and a cross-sectional area perpendicular to the length, with the cross-sectional area being at least about 0.10 square inches.

The terminals of the surge protector module may be provided in the form of plug-in means, such as prongs, and the plug-in means may be plugged directly into a number of apertures or holes formed in the conductive buses.

The surge protector module may include a surge protector having first and second terminals, first plug-in means disposed in an aperture formed in the first conductive bus for conductively connecting the first terminal of the surge protector to the first conductive bus, and second plug-in means disposed in an aperture formed in the second conductive bus for conductively connecting the second terminal of the surge protector to the second conductive bus.

The electrical protection apparatus may be specifically designed to protect a 120/240 volt power line having two power lines and a neutral conductor, in which case the apparatus is provided with eight electrical terminals, four conductive buses, and at least four surge protector modules for protection of the power line.

In another aspect, the invention is directed to an electrical surge protection apparatus having a support member, at least two strings of silicon avalanche diodes electrically interconnected in series and disposed on the support member, a first terminal conductively connected to the first ends of the first and second strings, and a second terminal conductively connected to the second ends of the first and second strings, with the two strings being connected in parallel. The apparatus may be provided with first plug-in means conductively coupled to the first terminal and second plug-in means conductively coupled to the second terminal, and each of the first and second strings may additionally include a fuse.

The surge protection apparatus preferably has a suppression voltage of less than about 330 volts across its terminals when subjected to a surge pulse having an open-circuit voltage with a peak magnitude of about 6,000 volts, a rise time of about 1.5 microseconds, and a 50% decay time of about 50 microseconds, and a short-circuit current pulse having a peak magnitude of about 3,000 amperes, a rise time of about eight microseconds, and a 50% decay time of about 20 microseconds.

These and other features and advantages of the present invention will be apparent to those of ordinary skill in the art in view of the detailed description of the preferred embodiment, which is made with reference to the drawings, a brief description of which is provided below.

DETAILED DESCRIPTION OF A PREFERRED EMBODIMENT

Figure 1:
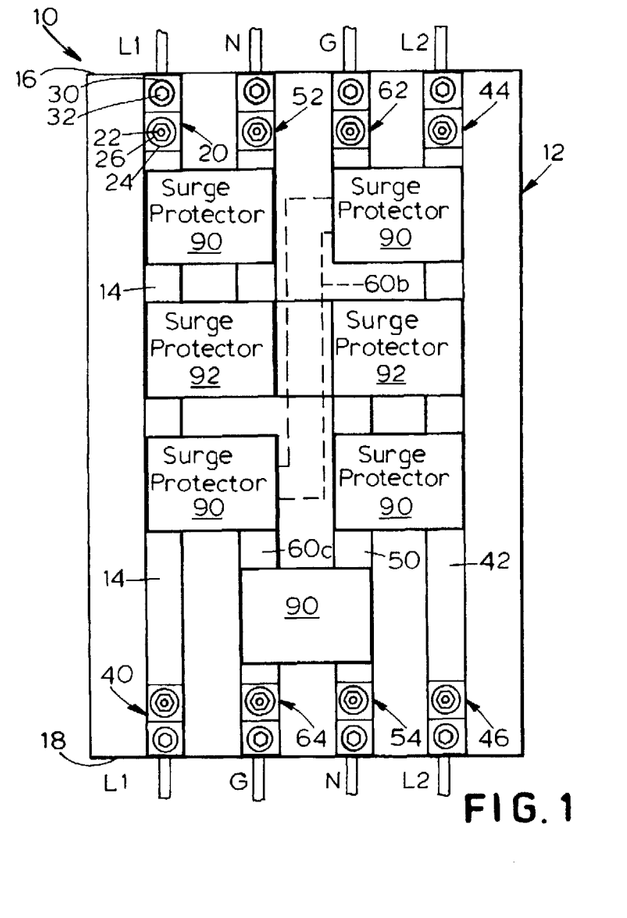
FIG. 1 is a top view of a preferred embodiment of a surge protection device having a plurality of surge protector modules in accordance with the invention.

Referring to FIG. 1, a preferred embodiment of a surge protection apparatus 10 designed to protect a conventional 120/240 volt, single-phase, three-wire power line having two "hot wires" and a neutral conductor is shown. Typically, the two hot wires and the neutral conductor are separately insulated. The surge protection apparatus 10 could, with straightforward modifications, be used to protect other systems, such as a three-phase power line, which is typically composed of three hot wires and a neutral conductor. As used herein, the term "power line" includes a hot wire, a neutral conductor, and a ground conductor, as well as an overall power line composed of such wires and conductors.

Figure 2:
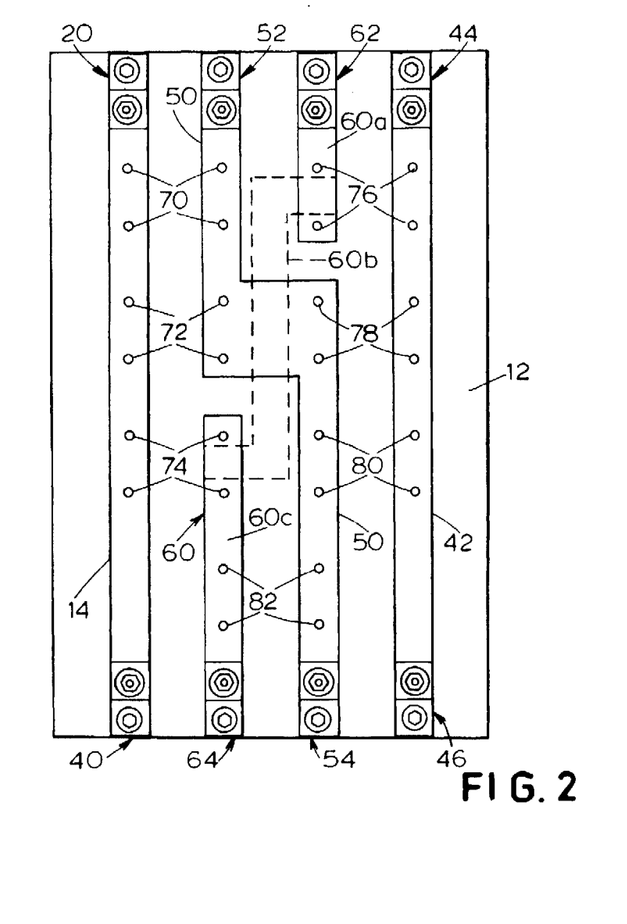
FIG. 2 is a top view of the surge protection device with the surge protector modules removed.

Referring to FIGS. 1 and 2, the surge protection apparatus 10, which may be provided with an outer housing (not shown), has a support plate 12 in the form of a printed circuit board on which the internal components of the apparatus 10 are disposed. These components include a straight conductive bus bar 14 having an upper end (as shown in FIGS. 1 and 2) generally coincident with a top edge 16 of the support plate 12 and a lower end generally coincident with a bottom edge 18 of the support plate 12.

Figure 3:
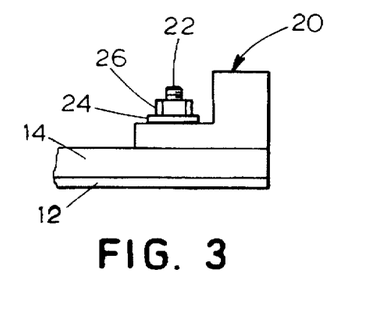
FIG. 3 is a side view of one of the line connectors of the surge protection device of FIG. 1.

A line connector 20, which acts as an electrical terminal for a line designated L1 in FIG. 1, is disposed on top of the upper end of the bus bar 14. As shown in FIGS. 1 and 3, the line connector 20 is connected to the bus bar 14 via a screw 22 which passes upwardly through the bus bar 14 and the line connector 20, a washer 24, and a nut 26 which fastens the line connector 20 to the bus bar 14. A lock washer (not shown) may be used on top of the washer 24.

Figure 4:
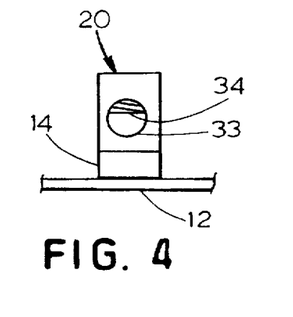
FIG. 4 is a front view of the line connector of FIG. 3.

The line connector 20 has a wire-clamping device in the form of a screw 30 which is threadably disposed in the line connector 20. The screw 30 may be rotated via a hexagonal opening 32 in its upper surface. Referring to FIG. 4, a circular aperture 33 is formed in the end of the line connector 20. The conductive portion of the line L1 may be clamped within the line connector 20 by inserting the conductive portion into the aperture 33 and then turning the screw 30 downwardly so that a bottom edge 34 of the screw 30 clamps the conductive portion of the line against the bottom portion of the circular aperture 33.

Referring back to FIGS. 1 and 2, a line connector 40, which acts as an electrical terminal for a second portion of the line L1, is disposed on top of the lower end of the bus bar 14. The surge protection apparatus 10 includes a straight conductive bus bar 42 having an upper end generally coincident with the top edge 16 of the support plate 12 and a lower end generally coincident with the bottom edge 18 of the support plate 12. A pair of line connectors 44, 46 are disposed on top of the upper and lower ends of the bus bar 42 to facilitate electrical connection of the bus bar 42 between two portions of a line designated L2. The surge protection apparatus 10 includes a conductive bus bar 50 and a pair of line connectors 52, 54 disposed on top of the upper and lower ends of the bus bar 50 to facilitate electrical connection of the bus bar 50 between two portions of a neutral conductor designated N.

The surge protection apparatus 10 also includes a conductive bus bar 60 and a pair of line connectors 62, 64 disposed on top of the upper and lower ends of the bus bar 60 to facilitate electrical connection of the bus bar 60 between two portions of a ground conductor designated G. The bus bar 60 is composed of two end portions 60a, 60c disposed on one side of the support plate 12 and a middle portion 60b, conductively connected to the two end portions 60a, 60c, disposed on the reverse side of the support plate 12. The middle portion 60b of the bus bar 60 passes through two square holes (not shown) in the support plate 12 to enable it to be connected to the end portions 60a, 60c of the bus bar 60.

The bus bars 14, 42, 50 and bus bar portions 60a–60c may be fixed to the support plate 12 in any conventional manner, such as by being bolted or riveted to the support plate 12. The bus bar portion 60b may also be connected to the bus bar portions 60a, 60c by bolts or rivets (not shown). The eight line connectors shown in FIGS. 1 and 2 have the same construction as described above, which is shown in more detail in FIGS. 3 and 4. The line connectors may be composed of any suitable conductive material, such as copper or brass.

The bus bars 14, 42, 50 are sized to have a continuous current-carrying capability of at least about 60 amperes since current in the lines L1, L2 and the neutral conductor N flows through the bus bars 14, 42, 50 during normal operation of the surge protection apparatus 10. This current-carrying capability may be provided by making the cross-sectional area of the bus bars 14, 42, 50, taken in a plane perpendicular to the length of the bus bars 14, 42, 50, at least about 0.10 square inches, and preferably at least about 0.20 square inches. For example, the bus bars 14, 42, 50 may be provided with a width of 0.75 inches and a height of 0.25 inches. The cross-sectional area of the bus bar 60 for the ground conductor G may be made smaller since significant current does not normally flow through the ground conductor G. The bus bars 14, 42, 50, 60 are preferably composed of copper.

Referring to FIG. 2, a pattern of apertures is formed in the bus bars 14, 42, 50, 60 and the support plate 12. These apertures or holes, which are generally cylindrical in shape, include a first group of four holes 70 (two being formed in the bus bar 14 and two being formed in the bus bar 50); a second group of four holes 72 (two being formed in the bus bar 14 and two being formed in the bus bar 50); a third group of four holes 74 (two being formed in the bus bar 14 and two being formed in the bus bar section 60c); a fourth group of four holes 76 (two being formed in the bus bar portion 60a and two being formed in the bus bar 42); a fifth group of four holes 78 (two being formed in the bus bar 50 and two being formed in the bus bar 42); a sixth group of four holes 80 (two being formed in the bus bar 50 and two being formed in the bus bar 42); and a seventh group of four holes 82 (two being formed in the bus bar section 60a and two being formed in the bus bar 50).

Each group of four holes may be "keyed" so that a surge protector module may be plugged into those four holes in only one way. For example, the two holes 70 formed in the bus bar 14 associated with line Li may be spaced closer together than the two holes 70 formed in the bus bar 50 associated with the neutral conductor N.

Figure 5:
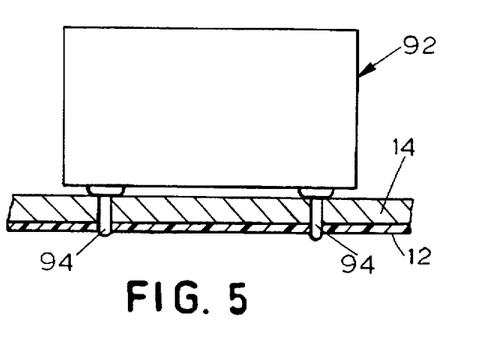
FIG. 5 is a side view of one of the surge protector modules shown mounted in the surge protection device, a portion of which is shown in cross-section.

Referring to FIG. 1, the surge protection device 10 includes five surge protector modules 90 of one type and two surge protector modules 92 of a different type. Each of the surge protector modules 90, 92 has four plug-in connectors or prongs 94 (FIG. 5) which are spaced to plug into a respective one of the groups of four holes in the bus bars 14, 42, 50, 60. The top portions of the holes in the bus bars 14, 42, 50, 60 may be provided with a chamfer to facilitate the insertion of the surge protector prongs 94 into the holes. A side view of one of the surge protector modules 92 when plugged into the bus bars is shown in FIG. 5.

The prongs 94, which act as terminals of the surge protector modules 90, 92, may be provided in the form of conventional "banana" jacks, each of which has four curved, spring-loaded metal side walls.

Figure 6:
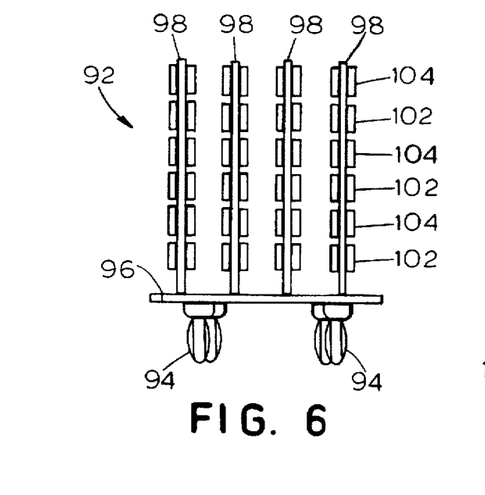
FIG. 6 is a side view of the internal structure of one type of surge protector module shown in FIG. 1.
Figure 7:
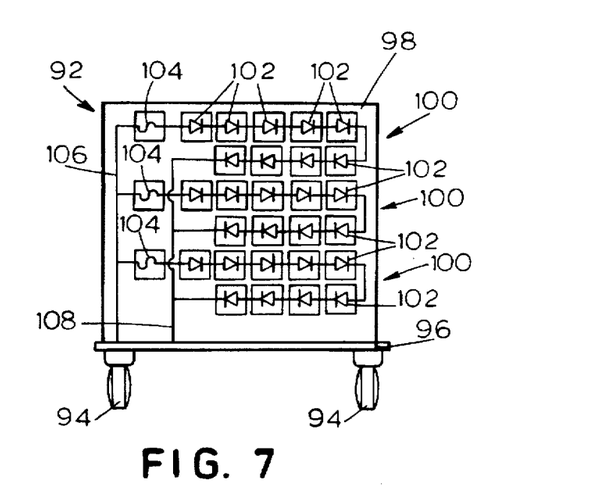
FIG. 7 is a front view of the internal structure of the surge protector module of FIG. 6.

The internal structure of one of the surge protector modules 92 is shown in FIGS. 6 and 7 Referring to those figures, each surge protector module 92 has four prongs 94 connected to a horizontal base plate 96 (e.g. a printed circuit board), and four vertically disposed support plates 98 (e.g. printed circuit boards). Each side of each support plate 98 has three series circuits 100 connected in parallel.

Each series circuit 100 is identical and is composed of nine silicon avalanche diodes 102 and a fuse 104 connected in series via printed metallization lines. A first end of each series circuit 100 (which terminates in a fuse 104) is conductively connected together via a metallization pattern 106 on the support plate 98, and a second end of each series circuit 100 (which terminates in a diode 102) is conductively connected together via a metallization pattern 108 on the support plate 98. The metallization patterns 106, 108 act as terminals of each of the series circuits 100.

All of the metallization patterns 106 on the four plates 98 of each surge protector module 92 are conductively connected in common to two of the prongs 94 (the two prongs 94 which plug into the conductive buses for the lines L1 and L2) of the module 92, and the metallization patterns 108 on two of the plates 98 are conductively connected to a third prong 94 (a prong which plugs into the conductive buses for the neutral or ground conductors) of the module 92, and the metallization patterns 108 on the other two plates 98 are conductively connected to a fourth prong 94 (a prong which plugs into the conductive buses for the neutral or ground conductors) of the module 92.

The diodes 102 and the fuses 104 may be fixed to the support plate 98 via conventional surface-mount technology. Each series circuit 100 functionally acts as an individual surge protector. Each surge protector module 92 has 24 strings of series-connected diodes 102, with six strings disposed on each of the four support plates 98. Any surge current that passes through one of the modules 92 therefore is divided substantially equally among the 24 strings of diodes 102. Thus, the magnitude of the surge current that passes through any one string of diodes 102 is approximately 1/24 of the magnitude of the overall surge current.

Each individual diode 102 turns on when a threshold voltage (e.g. 24 volts) across its terminals is reached. Thus, when the voltage across one of the diode strings 100 reaches a higher voltage threshold (e.g. 216 volts, which equals 9 diodes x24 volts per diode), the entire string 100 becomes conductive. In the event the surge current for a string 100 becomes excessive, the fuse 104 associated with that string 100 melts, causing that string 100 to become an open circuit.

The silicon avalanche diodes 102, which are conventional devices commercially available from General Instrument or SGS Thomson, have an overall power rating, which corresponds to the product of the rated voltage and the rated current. By using diodes having a relatively low rated voltage (e.g. 24 volts), the current carrying capability of the diodes can be relatively high, and by connecting the diodes in series, the relatively low rated voltage of each individual diode can be increased to a higher overall threshold voltage (e.g. 216 volts).

Each of the surge protector modules 92 has a suppression voltage of about 270 volts across its terminals when, in accordance with UL Standard 1449, it is subjected to a surge pulse having an open-circuit voltage with a peak magnitude of about 6,000 volts, a rise time of about 1.5 microseconds, and a 50% decay time of about 50 microseconds, and a short-circuit current pulse having a peak magnitude of about 3,000 amperes, a rise time of about eight microseconds, and a 50% decay time of about 20 microseconds. This relatively low suppression voltage is due to the relatively low voltage across each of the diodes 102 when the diodes are in a conductive state during a surge.

Figure 8:
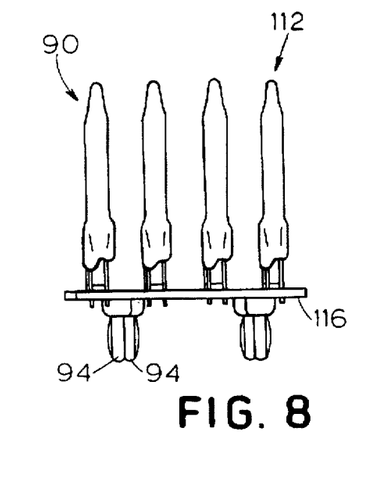
FIG. 8 is a side view of the internal structure of a different type of surge protector module shown in FIG. 1.
Figure 9:
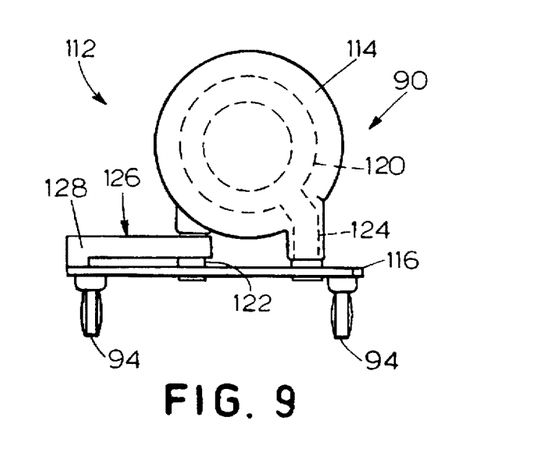
FIG. 9 is a front view of the internal structure of the surge protector module of FIG. 8.

The internal structure of one of the surge protector modules 90 incorporated in the surge protection apparatus 10 is shown in detail in FIGS. 8–10C. Referring to FIGS. 8 and 9, each module 90 has four individual surge protection devices 112, each of which incorporates a conventional surge protector 114 in the form of a metal-oxide varistor (MOV), attached to a base plate 116 (e.g. a printed circuit board) having four prongs 94.

Referring to FIG. 9, each surge protector 114 has a pair of electrodes in the form of internal conductive rings 120 which are separated by a portion of metal oxide. The electrodes 120 and the metal oxide are covered by an insulating coating. Each of the electrodes 120 is electrically connected to one of a pair of terminals 122, 124, and the terminal 122 has a thermal disconnect mechanism attached to it in the form of a flexible conductor 126 and a portion of solder which conductively interconnects the end of the conductor 126 with the terminal 122.

The four flexible conductors 126 of the four surge protectors 114 of each surge protector module 90 are conductively connected in common to two of the prongs 94 (the two prongs 94 which plug into the conductive buses for the lines L1 and L2) of the module 90, and two of the four terminals 124 of each surge protector module 90 are conductively connected to a third prong 94 (a prong which plugs into the conductive buses for the neutral or ground conductors) of the module 90, and the remaining two of the four terminals 124 of each surge protector module 90 are conductively connected to a fourth prong 94 (a prong which plugs into the conductive buses for the neutral or ground conductors) of the module 90.

Figure 10A:
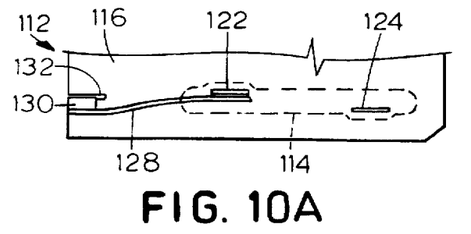
FIGS. 10A and 10B illustrate the operation of a thermal disconnect spring associated with the surge protector module of FIGS. 8 and 9.
Figure 10B:
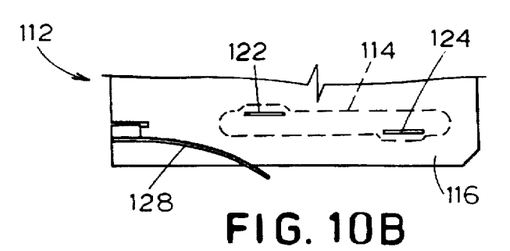
Figure 10C:
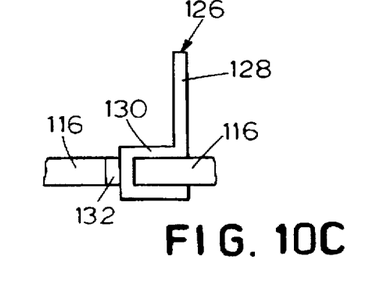
FIG. 10C is a side view of a portion of the thermal disconnect spring of FIGS. 10A and 10B.

As shown in FIGS. 9, 10A and 10C, the conductor 126 has a flat vertically disposed portion 128 integrally formed with a C-shaped anchor portion 130 (see FIG. 10C, which is an enlarged view of a portion of the base plate 116 showing the conductor 126) which is disposed in a slot 132 formed in the base plate 116 to anchor the conductor 126 to the base plate 116. The C-shaped portion 130 may be permanently fixed to the base plate 116 via solder or a low-resistance conductive adhesive.

The surge protection device 112 of FIG. 10A is shown in an intact or ready state in which the terminal 122 is conductively coupled to the end of the conductor 128. In the event an overvoltage surge of sufficient magnitude and duration occurs across the terminals 122, 124 of the surge protector 114, the heat due to the relatively large current passing through the metal oxide portions of the surge protector 114 will melt the solder holding the end of the conductor 128 to the terminal 122, whereupon the end of the conductor 128 will be forced away from the terminal 122, causing the surge protector module 90 to be in a disconnected or inoperable state, as shown in FIG. 10B.

The conductor 126 may be composed of any suitable conductive material that remains flexible at relatively high temperatures, such as a copper-beryllium alloy (e.g. 0.2% beryllium). The flexible conductor 126 may be provided with a predetermined spring bias or arc, or it may simply be a straight metal portion, the end of which is flexed towards the surge protector terminal and held in place against the surge protector terminal by solder.

Although not considered to be part of the present invention, the surge protector modules 90, 92 may be monitored to determine the amount of surge protection remaining in the event that one or more of the individual surge protectors 100, 114 disposed inside the modules 90, 92 becomes inoperable. This monitoring may be accomplished in the manner disclosed in U.S. Patent application Ser. No. 08/618,342 filed Mar. 19, 1996 and entitled "Electrical Surge Protection System With Condition Monitoring," the disclosure of which is incorporated herein by reference.

Numerous modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. An electrical surge protection apparatus designed to protect a 120/240 volt, three-wire power line having a first power line, a second power line, and a neutral conductor, said surge protection apparatus comprising:

a first electrical terminal adapted to be connected to a first portion of said first power line;

a second electrical terminal adapted to be connected to a second portion of said first power line;

a first conductive bus having a first portion conductively connected to said first electrical terminal and a second portion conductively connected to said second electrical terminal, said first conductive bus being sized to have a continuous current-carrying capability of at least about 60 amperes;

a third electrical terminal adapted to be connected to a first portion of said second power line;

a fourth electrical terminal adapted to be connected to a second portion of said second power line;

a second conductive bus having a first portion conductively connected to said third electrical terminal and a second portion conductively connected to said fourth electrical terminal, said second conductive bus being sized to have a continuous current-carrying capability of at least about 60 ampers;

a fifth electrical terminal adapted to be connected to a first portion of said neutral conductor;

a sixth electrical terminal adapted to be connected to a second portion of said neutral conductor;

a third conductive bus having a first portion conductively connected to said fifth electrical terminal and a second portion conductively connected to said sixth electrical terminal, said third conductive bus being sized to have a continuous current-carrying capability of at least about 60 amperes;

a seventh electrical terminal adapted to be connected to a first portion of a ground conductor;

an eighth electrical terminal adapted to be connected to a second portion of said ground conductor;

a fourth conductive bus having a first portion conductively connected to said seventh electrical terminal and a second portion conductively connected to said eighth electrical terminal;

a first surge protector module having at least one surge protector, said protector module having a first terminal and a second terminal;

means for conductively connecting said first terminal of said first surge protector module directly to said first conductive bus and said second terminal of said first surge protector module directly to said third conductive bus;

a second surge protector module having at least one surge protector, said second surge protector module having a first terminal and a second terminal;

means for conductively connecting said first terminal of said second surge protector module directly to said second conductive bus and said second terminal of said second surge protector module directly to said third conductive bus;

a third surge protector module having at least one surge protector, said third surge protector module having a first terminal and a second terminal;

means for conductively connecting said first terminal of said third surge protector module directly to said first conductive bus and said second terminal of said third surge protector module directly to said fourth conductive bus;

a fourth surge protector module having at least one surge protector, said fourth surge protector module having a first terminal and a second terminal; and means for conductively connecting said first terminal of said fourth surge protector module directly to said second conductive bus and said second terminal of said fourth surge protector module directly to said fourth conductive bus.

2. An apparatus as defined in claim 1 wherein one of said surge protector modules has a suppression voltage of less than about 330 volts across its terminals when subjected to a surge pulse having an open-circuit voltage with a peak magnitude of about 6,000 volts, a rise time of about 1.5 microseconds, and a 50% decay time of about 50 microseconds, and a short-circuit current pulse having a peak magnitude of about 3,000 amperes, a rise time of about eight microseconds, and a 50% decay time of about 20 microseconds.

3. An apparatus as defined in claim 1 wherein said terminals of said surge protector modules comprise plug-in means and wherein said means for conductively connecting said buses terminals of said surge protector modules directly to said conductive comprise apertures formed in said conductive buses.

4. An electrical surge protection apparatus, comprising:

a first electrical terminal adapted to be connected to a first portion of a first power line;

a second electrical terminal adapted to be connected to a second portion of said first power line;

a first conductive bus having a first portion conductively connected to said first electrical terminal and a second portion conductively connected to said second electrical terminal, said first conductive bus being sized to have a continuous current-carrying capability of at least about 60 amperes;

a third electrical terminal adapted to be connected to a first portion of a second power line;

a fourth electrical terminal adapted to be connected to a second portion of said second power line;

a second conductive bus having a first portion conductively connected to said third electrical terminal and a second portion conductively connected to said fourth electrical terminal, said second conductive bus being sized to have a continuous current-carrying capability of at least about 60 amperes;

a fifth electrical terminal adapted to be connected to a first portion of a neutral conductor;

a sixth electrical terminal adapted to be connected to a second portion of said neutral conductor;

a third conductive bus having a first portion conductively connected to said fifth electrical terminal and a second portion conductively connected to said sixth electrical terminal, said third conductive bus being sized to have a continuous current-carrying capability of at least about 60 amperes;

a seventh electrical terminal adapted to be connected to a first portion of a ground conductor;

an eighth electrical terminal adapted to be connected to a second portion of said ground conductor;

a fourth conductive bus having a first portion conductively connected to said seventh electrical terminal and a second portion conductively connected to said eighth electrical terminal;

a first surge protector module having at least one surge protector, said first surge protector module having a first terminal and a second terminal;

means for conductively connecting said first terminal of said first surge protector module directly to said first conductive bus and said second terminal of said first surge protector module directly to said third conductive bus;

a second surge protector module having at least one surge protector, said second surge protector module having a first terminal and a second terminal;

means for conductively connecting said first terminal of said second surge protector module directly to said second conductive bus and said second terminal of said second surge protector module directly to said third conductive bus;

a third surge protector module having at least one surge protector, said third surge protector module having a first terminal and a second terminal;

means for conductively connecting said first terminal of said third surge protector module directly to said first conductive bus and said second terminal of said third surge protector module directly to said fourth conductive bus;

a fourth surge protector module having at least one surge protector, said fourth surge protector module having a first terminal and a second terminal; and means for conductively connecting said first terminal of said fourth surge protector module directly to said second conductive bus and said second terminal of said fourth surge protector module directly to said fourth conductive bus.

5. An apparatus as defined in claim 4 wherein one of said surge protector modules has a suppression voltage of less than about 330 volts across its terminals when subjected to a surge pulse having an open-circuit voltage with a peak magnitude of about 6,000 volts, a rise time of about 1.5 microseconds, and a 50% decay time of about 50 microseconds, and a short-circuit current pulse having a peak magnitude of about 3,000 amperes, a rise time of about eight microseconds, and a 50% decay time of about 20 microseconds.

6. An apparatus as defined in claim 4 wherein said terminals of said surge protector modules comprise plug-in means and wherein said means for conductively connecting said terminals of said surge protector modules directly to said conductive buses comprise apertures formed in said conductive buses.

7. An apparatus as defined in claim 4 wherein said electrical terminals comprise line connectors.

8. An apparatus as defined in claim 4 wherein one of said conductive buses comprises a solid bar of conductive material having a length and a cross-sectional area perpendicular to said length, said cross-sectional area being at least about 0.10 square inches.

9. An apparatus as defined in claim 4 wherein one of said conductive buses comprises a solid bar of conductive material having a length and a cross-sectional area perpendicular to said length, said cross-sectional area being at least about 0.20 square inches.

10. An electrical surge protection apparatus, comprising:

a first electrical terminal adapted to be connected to a first portion of a first power line;

a second electrical terminal adapted to be connected to a second portion of said first power line;

a first conductive bus having a first end conductively connected to said first electrical terminal and a second end conductively connected to said second electrical terminal, said first conductive bus having an aperture formed therein, said first conductive bus being sized to have a continuous current-carrying capability of at least about 60 amperes;

a third electrical terminal adapted to be connected to a first portion of a second power line;

a fourth electrical terminal adapted to be connected to a second portion of said second power line;

a second conductive bus having a first end conductively connected to said third electrical terminal and a second end conductively connected to said fourth electrical terminal, said second conductive bus having an aperture formed therein, said second conductive bus being sized to have a continuous current-carrying capability of at least about 60 amperes; and a fifth electrical terminal adapted to be connected to a first portion of a third power line;

a sixth electrical terminal adapted to be connected to a second portion of said third power line;

a third conductive bus having a first end conductively connected to said fifth electrical terminal and a second end conductively connected to said sixth electrical terminal, said third conductive bus having an aperture formed therein said third conductive bus being sized to have a continuous current-carrying capability of at least about 60 amperes;

a first surge protector module comprising:
- a surge protector having a first terminal and a second terminal;
- first plug-in means, disposed in said aperture formed in said first conductive bus, for conductively connecting said first terminal of said first surge protector to said first conductive bus; and
- second plug-in means, disposed in said aperture formed in said second conductive bus, for conductively connecting said second terminal of said first surge protector to said second conductive bus; and a second surge protector module comprising:
- a surge protector having a first terminal and a second terminal;
- first plug-in means, disposed in said aperture formed in said second conductive bus, for conductively connecting said first terminal of said second surge protector to said second conductive bus; and
- second plug-in means, disposed in said aperture formed in said third conductive bus, for conductively connecting said second terminal of said second surge protector to said third conductive bus.

11. An apparatus as defined in claim 10 wherein one of said surge protector modules has a suppression voltage of less than about 330 volts across its terminals when subjected to a surge pulse having an open-circuit voltage with a peak magnitude of about 6,000 volts, a rise time of about 1.5 microseconds, and a 50% decay time of about 50 microseconds, and a short-circuit current pulse having a peak magnitude of about 3,000 amperes, a rise time of about eight microseconds, and a 50% decay time of about 20 microseconds.

12. An apparatus as defined in claim 10 wherein said apertures in said conductive buses comprise cylindrically shaped holes.

13. An apparatus as defined in claim 10 wherein said electrical terminals comprise line connectors.

14. An apparatus as defined in claim 10 wherein one of said conductive buses comprises a solid bar of conductive material having a length and a cross-sectional area perpendicular to said length, said cross-sectional area being at least about 0.10 square inches.

15. An apparatus as defined in claim 10 wherein one of said conductive buses comprises a solid bar of conductive material having a length and a cross-sectional area perpendicular to said length, said cross-sectional area being at least about 0.20 square inches.

16. An electrical surge protection apparatus, comprising:
a first electrical terminal adapted to be connected to a first portion of a first power line;

a second electrical terminal adapted to be connected to a second portion of said first power line;

a first conductive bus having a first portion conductively connected to said first electrical terminal and a second portion conductively connected to said second electrical terminal, said first conductive bus being sized to have a continuous current-carrying capability of at least about 60 amperes;

a third electrical terminal adapted to be connected to a first portion of a second power line;

a fourth electrical terminal adapted to be connected to a second portion of said second power line;

a second conductive bus having a first portion conductively connected to said third electrical terminal and a second portion conductively connected to said fourth electrical terminal, said second conductive bus being sized to have a continuous current-carrying capability of at least about 60 amperes;

a fifth electrical terminal adapted to be connected to a first portion of a third power line;

a sixth electrical terminal adapted to be connected to a second portion of said third power line;

a third conductive bus having a first portion conductively connected to said fifth electrical terminal and a second portion conductively connected to said sixth electrical terminal, said third conductive bus being sized to have a continuous current-carrying capability of at least about 60 amperes;

a first surge protector module having at least one surge protector incorporated therein, said first surge protector module having a first terminal and a second terminal;

means for conductively connecting said first terminal of said first surge protector module directly to said first conductive bus and said second terminal of said first surge protector module directly to said second conductive bus;

a second surge protector module having at least one surge protector incorporated therein, said second surge protector module having a first terminal and a second terminal;

means for conductively connecting said first terminal of said second surge protector module directly to said second conductive bus and said second terminal of said second surge protector module directly to said third conductive bus.

17. An apparatus as defined in claim 16 wherein one of said conductive buses comprises a solid bar of conductive material having a length and a cross-sectional sectional area perpendicular to said length, said cross-sectional area being at least about 0.10 square inches.

18. An apparatus as defined in claim 16 wherein one of said conductive buses comprises a solid bar of conductive material having a length and a cross-sectional area perpendicular to said length, said cross-sectional area being at least about 0.20 square inches.

19. An electrical surge protection apparatus, comprising:
a support member;

a plurality of first silicon avalanche diodes disposed on said support member, said first silicon avalanche diodes being electrically interconnected in series to form a first string having a first end and a second end;

a plurality of second silicon avalanche diodes disposed on said support member, said second silicon avalanche diodes being electrically interconnected in series to form a second string having a first end and a second end;

a first terminal conductively connected to said first ends of said first and second strings; and a second terminal conductively connected to said second ends of said first and second strings.

20. An apparatus as defined in claim 19 additionally comprising:
   first plug-in means conductively coupled to said first terminal; and
   second plug-in means conductively coupled to said second terminal.

21. An apparatus as defined in claim 19 wherein said surge protection apparatus has a suppression voltage of less than about 330 volts across its terminals when subjected to a surge pulse having an open-circuit voltage with a peak magnitude of about 6,000 volts, a rise time of about 1.5 microseconds, and a 50% decay time of about 50 microseconds, and a short-circuit current pulse having a peak magnitude of about 3,000 amperes, a rise time of about eight microseconds, and a 50% decay time of about 20 microseconds.

* * * * *